Figure 1:
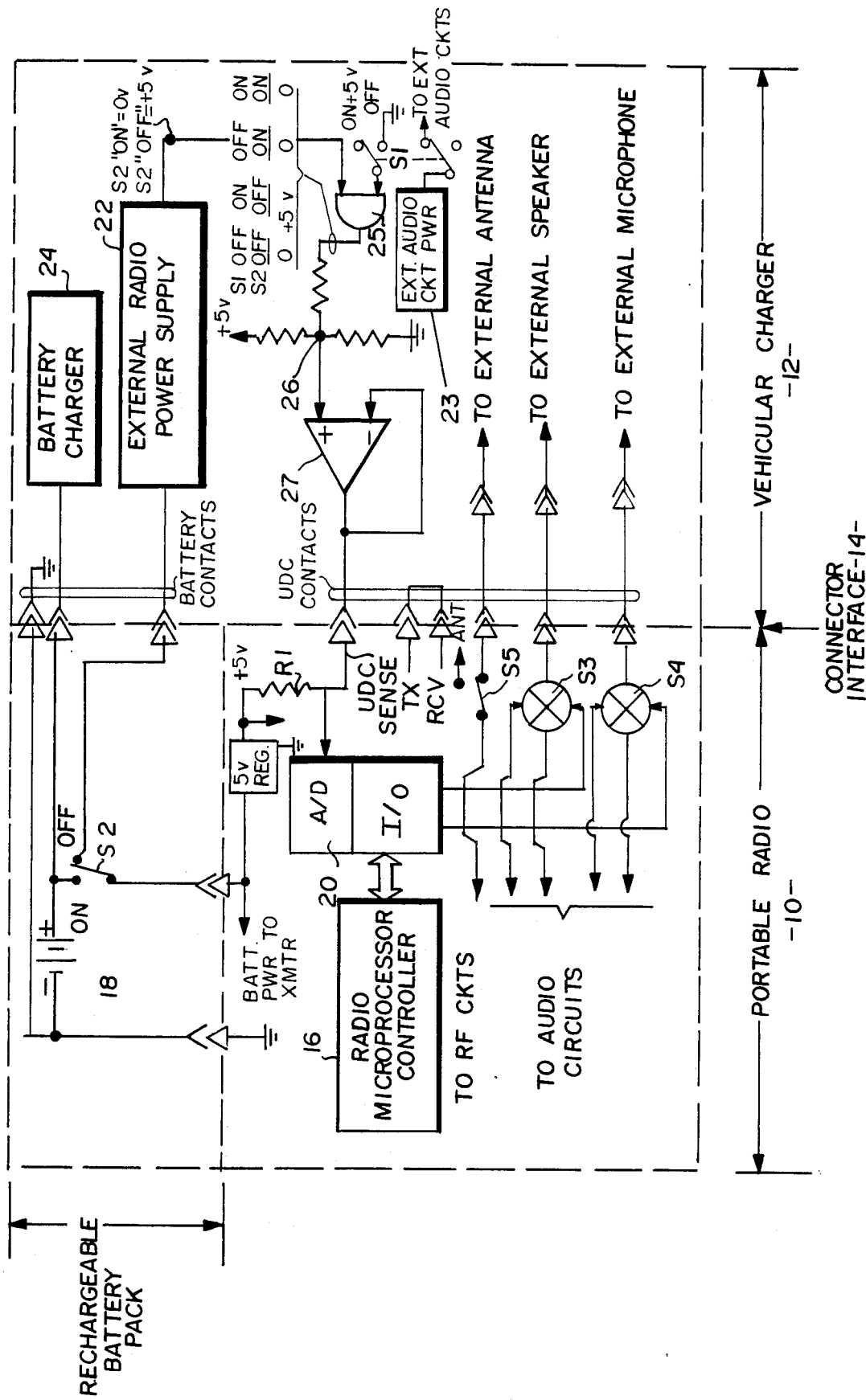

United States Patent [19]

Dubovsky et al.

[11] Patent Number: 4,673,861

[45] Date of Patent: Jun. 16, 1987

[54] BATTERY CHARGER/REMOTE CONTROL FOR PORTABLE RADIO DEVICES

[75] Inventors: George Dubovsky, Forest; Terry N. Garner, Lynchburg, both of Va.

[73] Assignee: General Electric Company, Lynchburg, Va.

[21] Appl. No.: 847,685

[22] Filed: Apr. 3, 1986

[51] Int. Cl.[4] .............................................. H02J 7/00
[52] U.S. Cl. ......................................... 320/2; 455/89; 455/100; 455/346
[58] Field of Search ............... 320/2; 455/89, 99, 100, 455/345, 346

[56] References Cited

U.S. PATENT DOCUMENTS 3,969,673  7/1976  Nordlöf ................................. 455/89
4,091,318  5/1978  Eichler et al. .......................... 320/2

Primary Examiner—Patrick R. Salce
Assistant Examiner—Anita M. Ault
Attorney, Agent, or Firm—Nixon & Vanderhye

[57] ABSTRACT

A vehicular battery charger connects with a battery powered portable radio via plural electrical contacts including a so-called "universal device connector" (UDC). A battery contact interface is also provided. Battery charging current as well as auxiliary radio operating power is made available at the contact interfaces. In addition, the charger is capable of remotely controlling the modus operandi of the portable radio device so as, if desired, to convert the portable radio device to provide vehicular mobile or fixed base radio operations during the battery charging process. If such modified radio operation is desired, the battery charger detects current being drawn from the external radio power supply source (for supplying power to the radio operating circuits independently of the portable radio battery which is then being charged) and automatically reconfigures the portable radio device as needed to effect the vehicular mobile or fixed base operation.

5 Claims, 2 Drawing Figures

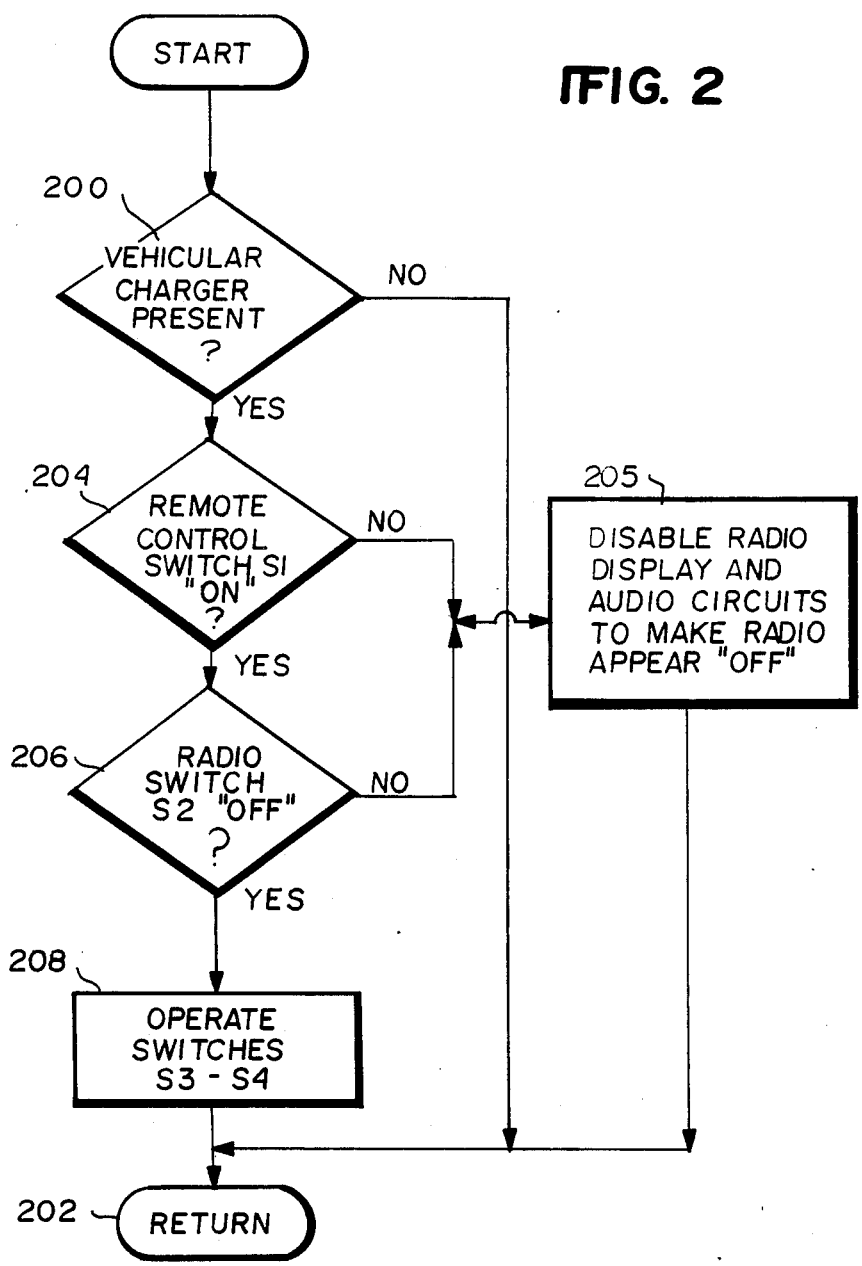

BATTERY CHARGER/REMOTE CONTROL FOR PORTABLE RADIO DEVICES

This application is generally directed to portable radio systems having externally accessible multi-point electrical connectors for connecting associated accessory devices. It is particularly directed to a battery charging circuit such as those to be located in a mobile vehicle or fixed-base location, which circuit is capable of changing the modus operandi of the portable radio during the battery charging operation.

This application is related to commonly assigned co-pending U.S. patent application, Ser. Nos. 790,903 filed Oct. 24, 1985; 844,158 filed Mar. 26, 1986; 844,152 filed Mar. 26, 1986 and 807,645 filed Dec. 11, 1985 (the content of Ser. No. 807,645 is hereby expressly incorporated by reference).

Portable "personal" radio systems are now commonplace. They are often hand-held or received within some sort of harness assembly strapped to a user for ready access. Such personal portable radio units are typically powered by rechargeable batteries which are periodically recharged whenever the radio device is temporarily stored in a battery charging holder or the like.

In many applications (e.g., some police and fire operations), a user sometimes also may be physically associated with a vehicle (or perhaps with a fixed base position) while, at other times, the user may be required to leave the vehicle (or fixed base position).

When a user is located in a vehicle (or fixed based location), there are typically higher gain, more efficient and/or more conveniently located antennae, loud speakers, microphones and electrical power supplies which should be used when possible. On the other hand, when the user leaves such environment, he often requires portable radio communications facilities to be carried with the person.

The portable radio described in related co-pending application Ser. No. 807,634 is designed to permit information about a connected accessory device to be monitored via a "universal device connector" (UDC) used for electrically and mechanically connecting the accessory to the portable radio. Such monitoring feature is exploited in the design of the vehicular battery charger of the present invention.

The following prior art issued United States patents, although not directly relating to portable radio systems, may provide a few (nonexhaustive) examples of some prior art approaches to other problems that may, in hindsight, have some relationship to the present invention:

U.S. Pat. No. 3,458,806—Snow (1969)
U.S. Pat. No. 3,464,012—Webb (1969)
U.S. Pat. No. 3,577,076—Frushour et al (1971)
U.S. Pat. No. 3,943,440—Edwards (1976)
U.S. Pat. No. 4,006,396—Bogut (1977)
U.S. Pat. No. 4,491,792—Bullock et al (1985)

Snow provides a sequential tester for measuring the inter-pin impedances of a multi-pin connector as part of a product quality testing arrangement associated with the manufacture of a connected device.

Webb, Frushour et al, and Edwards each teach various types of electrical signal measuring instruments wherein the range or scale selection and/or sensitivity of the measurement device is automatically determined by a corresponding electrical impedance element associated with and connected concurrently to the measuring device with a measurement probe or the like.

Bogut teaches a universal battery charging apparatus wherein a given type of battery pack includes a uniquely corresponding resistance which is connected with the battery so as to become part of the active battery charging circuit. It thus adapts the battery charger to provide proper charging current and potential for that particular battery pack.

Bullock et al provides a special magnetically actuated sensing switch physically associated with a communications port connector so as to provide a proper enabling signal only when a proper communications cable with magnetic actuator is interconnected with it.

It is also known to provide a remote videotape recorder control where a characteristic resistance is connected across a programming lead to signal which of plural push button switches has been activated.

In accordance with this invention, when a suitably designed portable radio is placed into the vehicular charger, connections are made across the electrical connection interface to permit the radio and charger to operate together in a normal mode of operation which includes (1) independently charging the portable radio battery and (2) if signalled via a predetermined switched condition on the vehicular charger, the operating portable radio circuits are connected across the interface so as to be powered from a separate external power supply and also to be operatively interconnected with an external antenna, external speaker and external microphone. The net result is conversion of the portable radio device into a mobile radio installation (or even a "fixed base") whenever the portable radio is inserted into the "vehicular" (or "fixed base") charger and the charger has been conditioned to select this particular mode of operation.

To avoid possibly hazardous charging currents when defective batteries are involved and to insure proper battery charging, the changed mode of radio operation is only permitted when the portable radio device itself is turned "off". When switched to the "off" position, a secondary current supply capable of powering the transmitter is connected to power the radio circuits but isolated from the battery. The auxiliary operating power supply is designed to determine whether the connected portable radio is turned "on" or "off" by detecting whether operating current is or is not being drawn from the auxiliary power supply. In addition, the vehicular charger of the present invention provides a circuit for selectively connecting predetermined impedance (or voltage) values across its UDC sense line interface with the portable radio so that the portable radio controller monitoring such a connected impedance can determine (1) the identity of the particular accessory device connected (i.e., a vehicular charger) and, in addition (2) whether a switch selection has been made to leave the portable radio device "off" (thus effectively selecting only a battery charging function) or whether the radio functions of the portable radio device should be switched "on" so as to be powered by an external power supply with radio/audio functions being remoted to external mobile or fixed base devices during the battery charging function.

In the exemplary embodiment, a battery charger is connected with a battery powered portable radio, in part, via a universal device connector (UDC) so as to recharge the radio battery and to remotely control operation of the radio during the recharging process. The battery charger itself also includes another mating electrical connection interface of plural electrical contacts and a battery charger which supplies battery charging current to a predetermined one of those contacts.

In addition, the vehicular charger includes a remote control switch for connecting either of two different predetermined impedances or voltages to a so-called "UDC sense" contact of the interface. The presence of one or the other of these two predetermined impedances or voltages represents (a) the connected presence of this particular type of charging device and (2) a selected "on" or "off" condition for the radio operating circuits during the charging process. The charger control switch is typically located to permit user selection of the desired operational mode: "on" (remote circuit is active) or "off" (remote circuit is disabled).

An external power supply is also available for supplying radio operating power through the battery contacts in the event remoted mobile radio operation is selected. Still further, the electrical contacts in the UDC interface are available for connection with external antennas, speakers, microphones and the like so as to convert the portable radio to provide vehicular mobile or fixed based radio operations during the battery charging process if that mode of operation has been selected.

These as well as other objects and advantages of this invention will be more completely understood and appreciated by carefully reading the following detailed description of a presently preferred exemplary embodiment when taken in conjunction with the accompanying drawings, of which:

FIG. 1 is an abbreviated electrical schematic diagram of some of the portable radio circuits as well as the electrical contact interface and an exemplary embodiment of the vehicular charger in accordance with this invention; and FIG. 2 is an abbreviated flowchart for a relevant segment of the controlling program which may be used in the microprocessor controller of the portable radio in FIG. 1 so as to achieve the desired remote radio control features of the interconnected vehicular charger.

As shown in FIG. 1, a portable radio 10 is connected to a vehicular charger 12 across a connector interface 14. Typically, the interface 14 may be mechanically adapted so that the portable radio 10 needs merely to be slipped into an open recess of the vehicular charger device which also physically supports the portable radio device during the charging process while maintaining its operating displays and switches in a conveniently observable and operable location. One suitable embodiment for the portable radio 10 is explained in greater detail in copending commonly assigned related applications Ser. Nos. 807,645 and 790,903.

In brief, the portable radio 10 may be functionally controlled by a microprocessor controller 16 and powered by an internal or detachable rechargeable battery 18. When used in the portable mode, switch S2 must be switched to the "on" position so as to power the portable radio from its own battery 18. Microprocessor 16 is either connected to or includes conventional input/output digital circuits including analog-to-digital converter functions or the like as depicted at block 20 in FIG. 1.

When the radio is placed in the vehicular charger, the position of the "on" and "off" switch S2 may be detected by conventional current sensing circuits associated with the external auxiliary power supply 22 which provides a control voltage V1 if no auxiliary current is being drawn (i.e., S2 is "on") and which provides a control votage V2 if current is being drawn. In addition, the microprocessor 16 is programmed to periodically measure the value of voltage connected to the A/D input 20.

As shown in FIG. 1, resistor R1 is connected to the UDC sense contact of interface 14 so that a predetermined external impedance (or voltage source) may be connected to complete a voltage divider with R1. In this manner, predetermined values of voltage at the UDC sense contact may be assigned to particular types of auxiliary devices which may be connected to interface 14.

In the exemplary embodiment, two such voltages (or impedances) are assigned to identify vehicular charger 12. One value of voltage indicates an "off" position of switch S1 (regardless of the S2 condition) while the other value of voltage indicates a conjunctive "on" value for switch S1 and an "off" value for switch S2.

In this manner, when the vehicular charger 12 is connected to the portable radio device 10, the microprocessor 16 may be programmed (as depicted by the flowchart segment of FIG. 2) to detect whether the vehicular charger is present at block 200. If not, then the whole program segment of FIG. 2 is bypassed to "return" block 202. On the other hand, if the vehicular charger is present, then a test is made for the condition of switch S1 at block 204. If switch S1 is "on" and if radio switch S2 is also "off" (as may be tested at block 206), then control is passed to block 208 where switches S3 and S4 are operated before return is taken at block 202. (As will be appreciated, blocks 204 and 206 are effectively combined in the exemplary embodiment due to the logical AND operation of AND gate 25 in the charger.) The external antenna is mechanically switch connected (conventionally) at S5 to the RF circuits of the radio 10.

On the other hand, if remote control switch S1 is "off" or if radio switch S2 is "on", then control is passed to block 205 (via the "no" output branches of blocks 204 and/or 206) where the radio display and audio circuits are disabled (e.g. by turning electronic switches off) to make the radio appear to be "off." Thus, the same sort of bypassing/disabling operation will also occur if, by chance, the operator has left the radio switch S2 in the "on" position. In this manner, a correct battery charging operation is insured while also permitting the user to continue utilization of the radio circuits via external radio power supply 22 and the external antenna, speaker and microphone circuits via controlled switches S3, S4, and S5. As should be appreciated, the desired battery charging operation of battery charger circuit 24 is thus achieved independently of radio control functions. A suitable external audio circuit power supply 23 is also provided in conjunction with one pole of switch S1 so as to provide operating voltage to external audio circuits when the remoted mode is chosen.

If the portable radio 10 is of the design depicted in related copending application Ser. No. 807,645, then the transmit (TX) and receive (RX) data lines at the connector interface 14 will be short-circuited when connected to the vehicular charger 12 (as depicted in FIG. 1) thus signalling microprocessor 16 of the fact that an auxiliary device of some sort has been connected and that the voltage present on the UDC sense line should now be monitored.

As will be appreciated, the portable radio 10 senses the condition of both the charger switch S1 and the radio switch S2 via charger 12. Since the identity of the accessory device must also be provided, the vehicular charger 12 must be capable of presenting either of at least two different connected impedances or voltages across the UDC sense line (and therefore determining either of two uniquely corresponding voltages on the UDC sense line input to the A-D circuits of the microprocessor 16). As depicted, the charger senses whether current is present in the auxiliary radio operating power supply lines and includes suitable logic circuits to provide appropriate voltage levels at the radio UDC contact. For example, AND gate 25 may provide a suitable input to summing node 26 which, in turn, feeds a voltage follower amplifier 27 which provides either of two voltages which represents sufficient information about the position of switches S1 and S2 to permit the above-described operation to occur.

While only one exemplary embodiment of this invention has been described in detail, those skilled in the art will recognize that variations and modifications may be made while yet retaining many of the novel features and advantages of this invention. Accordingly, such modifications and variations are intended to be included within the scope of the appended claims.

What is claimed is:

1. A vehicular battery charger for a battery powered portable radio, said charger comprising:
   battery charging means for providing battery charging current to the radio;
   an auxiliary operating power supply for independently providing operating electrical power to the radio during the battery charging operation; and
   control means connectable with said radio and capable of selectively providing at least two different electrical impedance values or voltages to said radio so as to enable the radio to sense the value of such connected impedance or voltage and to control its radio functions in a predetermined manner depending upon which impedance or voltage value is selected.

2. A vehicular battery charger for a battery powered portable radio, said charger comprising:
   battery charging means for providing battery charging current to the radio;
   an auxiliary operating power supply for independently providing operating electrical power to the radio during the battery charging operation; and
   control means connectable with said radio and capable of selectively providing at least two different electrical impedance values or voltages to said radio so as to enable the radio to sense the value of such connected impedance or voltage and to control its radio functions in a predetermined manner depending upon which impedance or voltage value is selected;
   wherein said remote control means includes a voltage summing node having one input conjunctively determined by (1) whether the auxiliary power supply is actually supplying current to the portable radio and (2) whether a separate switch is in a predetermined state.

3. A vehicular battery charger as in claim 1 wherein electrical connections to said radio are made, at least in part, via a universal device connector that may be associated with other types of connected accessory devices having other uniquely associated identifying values of electrical impedances or voltages connected to a predetermined connection point and including electrical connections for effecting remote radio operations via external antenna, speaker or microphone devices.

4. A battery charger for connection with a battery powered portable radio via plural electrical contacts to recharge the radio battery and to remotely control the operation of the radio during such recharging process, said battery charger comprising:
   a connection interface of plural electrical contacts mated with those of the portable radio;
   a battery charger means supplying battery charging current to a predetermined first one of said electrical contacts;
   a control means for connecting either of two different predetermined voltages or impedances to a predetermined second one of said electrical contacts representing the connected presence of the charging circuits and a predetermined condition of the radio operating circuits during the charging process;
   an external power supply for supplying radio operating power to a predetermined third one of said electrical contacts; and
   further of said electrical contacts being available for connection with an external antenna, an external speaker or an external microphone so as to convert the portable radio to provide vehicular mobile or fixed-base radio operations during the battery charging process.

5. A battery charger for connection with a battery powered portable radio via plural electrical contacts to recharge the radio battery and to remotely control the operation of the radio during such recharging process, said battery charger comprising:
   a connection interface of plural electrical contacts mated with those of the portable radio;
   a battery charger means supplying battery charging current to a predetermined first one of said electrical contacts;
   a control means for connecting either of two different predetermined voltages or impedances to a predetermined second one of said electrical contacts representing the connected presence of the charging circuits and a predetermined condition of the radio operating circuits during the charging process;
   an external power supply for supplying radio operating power to a predetermined third one of said electrical contacts; and
   further of said electrical contacts being available for connection with an external antenna, an external speaker or an external microphone so as to convert the portable radio to provide vehicular mobile or fixed-base radio operations during the battery charging process;
   said bettery charger being connected to a portable radio device which includes means for (1) detecting a first predetermined voltage or impedance on said second contact and responsively effecting at least one predetermined radio function via further electrical contacts of said interface and (2) detecting a second predetermined voltage or impedance on said second contact and responsively disabling at least one portable radio function so as to make the radio appear in an "off" condition.

* * * * *